United States Patent
Collins et al.

(10) Patent No.: US 12,151,417 B2
(45) Date of Patent: Nov. 26, 2024

(54) SYSTEMS AND METHODS FOR CONTROLLING INJECTION MOLDING USING PREDICTED CAVITY PRESSURE

(71) Applicant: THE PROCTER & GAMBLE COMPANY, Cincinnati, OH (US)

(72) Inventors: Bryler Collins, Maineville, OH (US); Gene Michael Altonen, West Chester, OH (US); Chow-Chi Huang, West Chester, OH (US); Brandon Michael Birchmeier, Morrow, OH (US); Brian Matthew Burns, Mason, OH (US)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 43 days.

(21) Appl. No.: 17/741,754

(22) Filed: May 11, 2022

(65) Prior Publication Data
US 2022/0266493 A1   Aug. 25, 2022

Related U.S. Application Data

(62) Division of application No. 16/401,777, filed on May 2, 2019, now Pat. No. 11,358,317.
(Continued)

(51) Int. Cl.
    *B29C 45/77* (2006.01)
(52) U.S. Cl.
    CPC .... *B29C 45/77* (2013.01); *B29C 2945/76006* (2013.01); *B29C 2945/76257* (2013.01);
    (Continued)
(58) Field of Classification Search
    CPC .......... B29C 2945/76949; B29C 45/77; B29C 2945/76257; B29C 2945/76862; B29C 2945/76006
    (Continued)

(56) References Cited

U.S. PATENT DOCUMENTS

| 3,840,312 A | 10/1974 | Paulson et al. |
| 2006/0197247 A1 | 9/2006 | Speight |

(Continued)

FOREIGN PATENT DOCUMENTS

| EP | 3055116 A1 | 8/2016 |
| WO | WO-2020/083611 A1 | 4/2020 |

OTHER PUBLICATIONS

Hutchinson, H.R. et al., "In-process control of injection viscosity", Modern Plastics, vol. 47, No. 10 (Oct. 1, 1970).
(Continued)

*Primary Examiner* — S. Behrooz Ghorishi
*Assistant Examiner* — Gregory C. Grosso
(74) *Attorney, Agent, or Firm* — MARSHALL, GERSTEIN & BORUN LLP

(57) ABSTRACT

In order to improve the consistency of molded products as viscosity shifts throughout a run, a controller of an injection molding machine executes a calibration cycle in accordance with a mold cycle. The controller analyzes a plurality of sensed melt pressure values during the calibration cycle to determine one or more calibration metrics. The controller then uses the calibration metrics when executing each mold cycle of the run. More particularly, during each mold cycle of the run, the controller detects a plurality of sensed melt pressures prior to and during a fill phase of the mold cycle and compares the plurality of sensed melt pressures to the one or more calibration metrics to predict cavity pressure for a pack and hold phase of the mold cycle. The controller then adjusts a set point pressure for the pack and hold phase based on the predicted cavity pressure.

11 Claims, 5 Drawing Sheets

Related U.S. Application Data

(60) Provisional application No. 62/665,866, filed on May 2, 2018.

(52) U.S. Cl.
CPC ............... *B29C 2945/76381* (2013.01); *B29C 2945/76735* (2013.01); *B29C 2945/76862* (2013.01); *B29C 2945/76933* (2013.01); *B29C 2945/76943* (2013.01)

(58) Field of Classification Search
USPC ........................................................ 264/2.2
See application file for complete search history.

(56) References Cited

U.S. PATENT DOCUMENTS

| 2015/0035189 A1* | 2/2015 | Altonen .............. B29C 45/7613 425/149 |
| 2016/0229101 A1 | 8/2016 | Schiffers |
| 2016/0250791 A1 | 9/2016 | Schiffers et al. |
| 2021/0387392 A1 | 12/2021 | Moser et al. |

OTHER PUBLICATIONS

International Search Report and Written Opinion for Application No. PCT/US2019/030374, dated Sep. 12, 2019.
European Patent Application No. 19752294.9, Communication Pursuant to Article 94(3) EPC, dated Feb. 24, 2022.

* cited by examiner

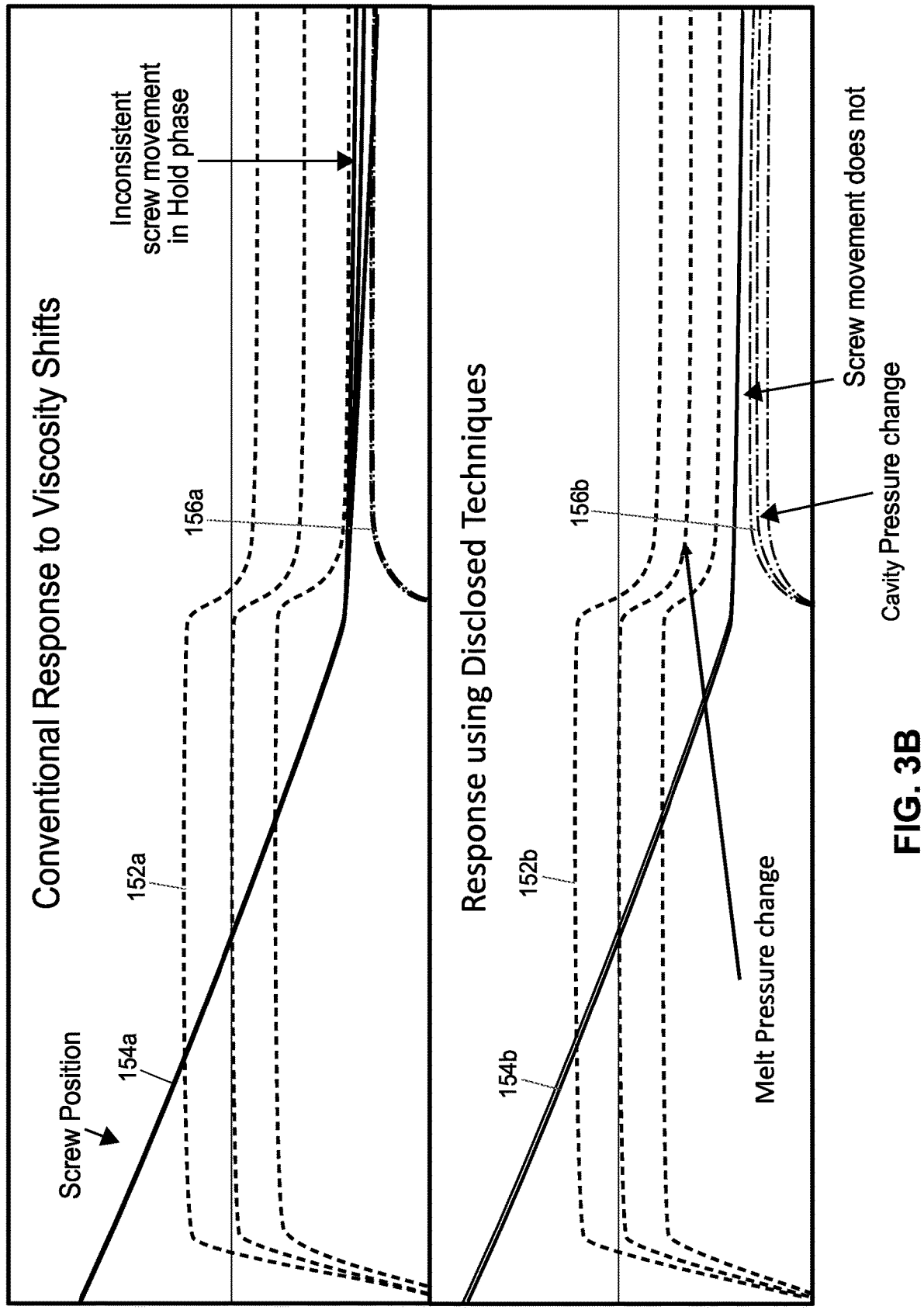

SYSTEMS AND METHODS FOR CONTROLLING INJECTION MOLDING USING PREDICTED CAVITY PRESSURE

CROSS-REFERENCE TO RELATED APPLICATIONS

This application is a divisional application that claims priority to U.S. application Ser. No. 16/401,777, entitled "Systems and Methods for Controlling Injection Molding Using Predicted Cavity Pressure", filed May 2, 2019, which claims priority to U.S. Provisional Application No. 62/665,866, entitled "Systems and Methods for Controlling Injection Molding Using Predicted Cavity Pressure", filed May 2, 2018, the entirety of both of which is hereby incorporated by reference.

FIELD OF THE INVENTION

This application relates generally to controlling an injection molding process and, more specifically, to controlling the injection molding process based upon a predicted pressure.

BACKGROUND OF THE INVENTION

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. Thus, a typical injection molding procedure comprises four basic operations: (1) heating the plastic in the injection molding machine to allow the plastic to flow under pressure; (2) injecting the molten plastic material into a mold cavity or cavities defined between two mold halves that have been closed; (3) allowing the molten plastic material to cool and harden in the cavity or cavities while under pressure; and (4) opening the mold halves and ejecting the part from the mold.

A control system that controls the injection molding machine executes a mold cycle that defines a series of control values for the various components of the injection molding machine. For example, the mold cycle may include a series of injection velocity and/or pressure set point values to control the manner in which the molten plastic material is injected into the mold. The mold cycle may also include a target pressure at which to pack/hold the material in mold while the molten plastic material is densifying, cooling, and solidifying. The control system is often configured to execute an injection molding run, or a plurality of mold cycles executed in series on the same injection molding machine.

Changes in molding conditions can significantly affect properties of the molten plastic material. More specifically, material specification differences between resin batches and changes in environmental conditions (such as changes in temperature or humidity) can raise or lower the viscosity of the molten plastic material. When viscosity of the molten plastic material changes, quality of the molded part may be impacted. For example, if the viscosity of the molten plastic material increases, the molded part may be "under-packed" or less dense, due to a higher required pressure, after filling, to achieve optimal part quality. On the other hand, if the viscosity of the molten plastic material decreases, the molded part may experience flashing as the thinner molten plastic material is pressed into the seam of the mold cavity. Furthermore, recycled plastic material that is mixed with virgin material may impact the melt flow index (MFI) of the combined plastic material. Inconsistent mixing of the two materials may also create MFI variation between cycles. Some conventional injection molding machines do not adjust the mold cycle to account for these changes in material properties. As a result, these conventional injection molding machines tend to produce lower quality parts, which must be removed during quality-control inspections, thereby leading to operational inefficiencies.

Moreover, as an injection molding run may include hundreds, if not thousands, of mold cycles, the environmental conditions of the injection molding machine are not constant across each mold cycle of the run. Thus, even if the mold cycle is adapted to account for the environmental factors at the start of the run, the changing environmental conditions may still result in the production of lower quality parts during mold cycles executed later in the run.

Prior attempts to control for changing material properties rely on monitoring of the hydraulic pressure, or the incorporation of a mold cavity pressure sensor to detect a change in viscosity. Attempts related to the monitoring of hydraulic pressure, relied upon the fact that if the same injection velocity is applied to the molten material in the filling phase, a target pressure will be reached. Monitoring of this pressure would be used to create injection pressure tolerances based on resultant part quality. Failure to meet these tolerances would often indicate a change in viscosity, and therefore a defective part. This would result in an alarm output to alert the operator(s)/technician(s) that a process change is needed to obtain quality parts. Attempts related to the incorporation of a cavity pressure transducer, rely upon the idea that quality of the molded part can be controlled or determined by the cavity pressures obtained in different areas of the mold. This method is similar to the monitoring of injection pressure, in that it is used as an alarm system to notify relevant personnel. Other methods use a mold cavity pressure sensor as a method of identifying points at which to change velocities or stages of the cavity filling process.

However, the use of a mold cavity pressure sensor impacts the shape of the resulting molded product. That is, the resulting molded product includes a deformity in the shape of the mold cavity pressure sensor. Thus, in these attempts to adjust for changing material properties, the design of the mold shape must account for the deformity introduced by the mold cavity pressure sensor. In many scenarios, this deformity is visible in the resulting molded product.

SUMMARY OF THE INVENTION

Embodiments of the present disclosure can be used to improve the operation of an injection molding machine by virtually determining the relative cavity pressure, as it changes due to viscosity/environmental variation. That is, the pressure in the mold cavity is predicted without including a physical pressure sensor in the mold cavity. As a result, the injection molding system may account for shifts in viscosity, using an automated system for setpoint adjustment, without introducing any deformities into the resulting molded product caused by the presence of the cavity pressure sensor. Additionally, disclosed techniques may also be used to sense other conditions within a molding cycle, or throughout a molding run. These conditions may include: injected molten material encountering different features within the mold cavity, the effect of shear on the viscosity of the material during injection, the indication of viscosity shifts throughout a molding run, and the indication of part/component wear or failure on the injection molding machine.

Generally, any shift in viscosity of the molten plastic material impacts the pressure response throughout an entire molding cycle. When set point melt pressure values are not adjusted to account for this, the viscosity shifts may impact the resultant quality of the molded product. Thus, by establishing a baseline performance of the injection molding machine, the impact on pressure required due to the change in viscosity can be quantified, and real-time adjustments can be made. That is, by comparing the performance of the injection molding machine during a first phase of a subsequent mold cycle, such as a fill phase, to the baseline performance, the impact of the change in viscosity of the molten plastic material on cavity pressure can be accurately predicted. As a result, the predicted cavity pressure can be used to drive operation of a screw during a second phase of the mold cycle, such as a pack and hold phase, to achieve a desired set point melt pressure.

Accordingly, embodiments disclosed herein use a controller that controls operation of the injection molding machine to execute a calibration cycle in accordance with a mold cycle prior to executing a run based on the same mold cycle. The controller may analyze a plurality of sensed machine and melt characteristics values during the calibration cycle to determine one or more calibration metrics that are used to establish the baseline performance for the injection molding machine.

In various embodiments, the calibration metrics include a calibration ratio of pressure during a pack and hold phase to pressure during the fill phase. By adjusting a cavity pressure to maintain this ratio, the injection molding machine is able to ensure that a screw advances to the same position during each execution of the mold cycle. Thus, the controller may compare the pressure during the fill phase of the particular mold cycle to the calibration ratio to determine the cavity pressure that drives a set point pressure for the pack and hold phase that maintains the calibration ratio. Consequently, the screw follows the correct movement pattern to reach the optimal end position in each execution of the mold cycle.

Changes in screw travel lead to inconsistency in the resulting molded products. Thus, in the conventional systems, the resulting molded product is more likely to include various deformities that result in the molded product being discarded. Said another way, implementing the disclosed techniques improves the quality of the resulting molded product across the run. In some scenarios, this improvement in quality enables a manufacturer to execute longer and more consistent runs, which reduces injection molding machine downtime.

In systems using a pressure-controlled filling of the mold, it should be appreciated that due to the shift in viscosity, there may be an error between steady-state pressure achieved during the fill phase and the set point pressure for the fill phase. However, because the impact of the shift in viscosity is roughly proportional throughout a mold cycle, the error caused by the shift in viscosity on the response of the injection molding machine is also impacted proportionally. That is, the error sensed prior to and during the fill phase, in conjunction with initially collected data from a baseline cycle, can be used to predict the error during the pack and hold phase. Accordingly, by determining a baseline calibration error, the error sensed at a particular point in a subsequent mold cycle can be used to predict the error at another point. Thus, comparing an error during a fill phase of a particular mold cycle to the calibration error enables the controller to account for system error when predicting the cavity pressure to drive the set point value for the pack and hold phase of the particular mold cycle.

With reference to FIG. 3A, a comparison plot of melt pressure during fill 112, cavity pressure 116, and melt pressure post-fill 114 against time is illustrated for conventional injecting molding systems, with (in the lower plot) and without (in the upper plot) the implementation of the disclosed techniques to respond to shifts in viscosity. As viscosity shifts throughout the run, the fill phase melt pressure responds by increasing or decreasing. This is illustrated by the two different melt pressure peaks 112. Without implementing disclosed techniques, the pack/hold pressure remains constant (illustrated by 114a). With disclosed techniques, the pack/hold pressure 114b is adjusted to compensate for changes in cavity pressure 116.

With reference to FIG. 3B, a comparison plot of melt pressure 152, cavity pressure 156, and screw position 154 against time is illustrated for current systems with, and without, implementation of the disclosed techniques to respond to shifts in viscosity. As viscosity shifts throughout the course of a run, the melt pressure set point is adjusted, thus, the steady-state melt pressure 152 during the fill phase of each mold cycle (the time period associated with the first plateau) varies over time. This is illustrated by the two additional melt pressure curves 152 having higher and lower peak melt pressures.

Without the disclosed techniques, the control system assumes that cavity pressure is constant and does not scale the cavity pressure input. The melt pressure peak may increase or decrease due to viscosity shifts. However, pressures after the fill phase will only reduce by a set amount 156a, and are unresponsive to viscosity shifts. The movement of the screw is controlled by a set pressure input, and as cavity pressure changes, that set pressure must be modified to counteract this change to achieve optimal screw movement, and thereby maintain part quality. Thus, the system without disclosed techniques is unable to maintain the calibration ratio. Accordingly the screw position 154a during the pack and hold phase of the mold cycle exhibits inconsistent behavior as the screw movement is unable to compensate for the change in counter-pressure from the cavity.

On the other hand, using the disclose techniques, as viscosity shifts cause the melt pressure 152b to change, the injection molding machine control system compensates for the shift in viscosity by scaling the cavity pressure 156b. As a result, the set point pressure for the pack and hold phase are adjusted to maintain the calibration ratio. Accordingly, the screw position 154b follows the same movement pattern for each mold cycle of the run, regardless of the shift in viscosity.

After generating the calibration metrics, the controller may execute a run at the injection molding machine. During each mold cycle of the run, the controller may detect a plurality of sensed melt pressure and velocity values during the fill phase of the mold cycle. The controller may then compare the sensed values to the calibration metrics to predict the cavity pressure during the pack and hold phase. The controller may then input the predicted cavity pressure to a screw control in order to achieve a set point pressure applied during the pack and hold phase of the mold cycle that ensures consistent performance by the injection molding machine.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

FIG. 3B is a comparison plot of melt pressure, hold pressure, and screw position against time for current systems with and without the implementation of the disclosed techniques.

DETAILED DESCRIPTION OF THE INVENTION

Figure 1:
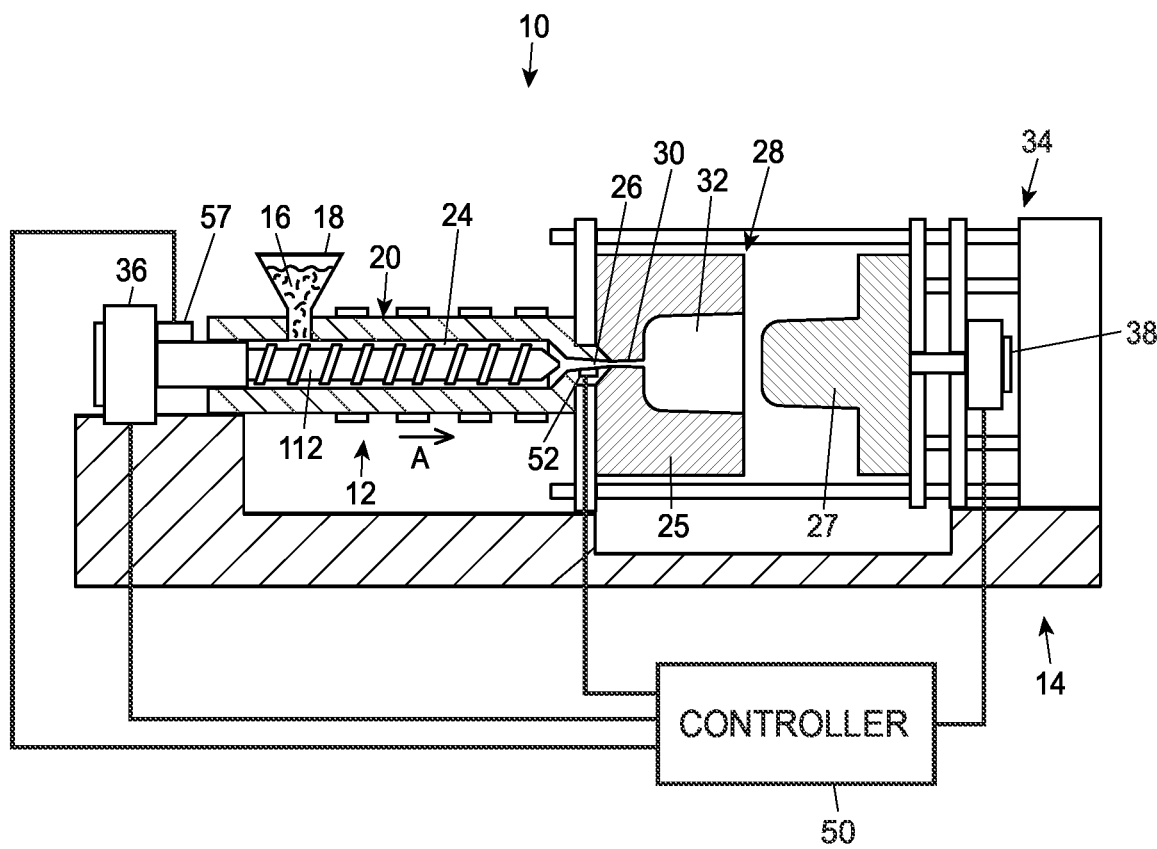
FIG. 1 illustrates a schematic view of an injection molding machine constructed according to the disclosure.

Referring to the figures in detail, FIG. 1 illustrates an exemplary injection molding apparatus 10 that generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28 via one or more gates 30 that direct the flow of the molten thermoplastic material 24 into the mold cavity 32. In other embodiments the nozzle 26 may be separated from one or more gates 30 by a feed system (not shown). The mold cavity 32 is formed between first and second mold sides 25, 27 of the mold 28 and the first and second mold sides 25, 27 are held together under pressure by a press or clamping unit 34. The press or clamping unit 34 applies a clamping force during the molding process that is greater than the force exerted by the injection pressure acting to separate the two mold halves 25, 27, thereby holding the first and second mold sides 25, 27 together while the molten thermoplastic material 24 is injected into the mold cavity 32. To support these clamping forces, the clamping system 14 may include a mold frame and a mold base.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold sides 25, 27, the first and second mold sides 25, 27 are separated from one another, and the finished part may be ejected from the mold 28. The mold 28 may include a plurality of mold cavities 32 to increase overall production rates. The shapes of the cavities of the plurality of mold cavities may be identical, similar or different from each other. (The latter may be considered a family of mold cavities).

A controller 50 is communicatively connected with a nozzle sensor 52, located in the vicinity of the nozzle 26, a linear transducer 57 located proximate the reciprocating screw 22, a screw control 36, and a clamp control 38 via one or more communication links. The one or more communication links may include a wired connection, a wireless connection, a mechanical connection, a hydraulic connection, a pneumatic connection, or any other type of wired or wireless communication connection known to those having ordinary skill in the art that will allow the controller 50 to with the sensors 52 or 57 and/or to send a control signal to the screw control 36, clamp control 38, or any other component of the injection molding apparatus 10. The controller 50 may include a memory that stores processor executable instructions that, when executed by a microprocessor of the controller 50, implement the disclosed techniques.

The linear transducer 57 may measure an amount of linear movement of the reciprocating screw 22 mechanically, optically, pneumatically, magnetically, electrically, ultrasonically, or the linear transducer 57 may use any other method of measuring linear movement. Similarly, the nozzle sensor 52 may sense the presence of thermoplastic material optically, pneumatically, electrically, ultrasonically, mechanically or otherwise by sensing changes due to the arrival of the thermoplastic material. When pressure of the thermoplastic material is measured by the nozzle sensor 52, the nozzle sensor 52 may send a signal indicative of the pressure to the controller 50 via one of the communication links. This signal may generally be used to control the molding process to account for the variations in viscosity of the thermoplastic material 24. For example, the controller 50 may analyze the pressure signal to develop one or more calibration metrics and/or to predict a pressure during to a later phase of a mold cycle. Further, in response to a detected change in viscosity of the thermoplastic material 24, the controller may modify operation of the clamp 14 by transmitting a signal over a communication link that adjusts a control parameter of the clamp control 38.

In the embodiment of FIG. 1, the nozzle sensor 52 may be a pressure sensor that measures (directly or indirectly) melt pressure of the molten thermoplastic material 24 in vicinity of the nozzle 26. The nozzle sensor 52 generates an electrical signal that is transmitted to the controller 50. The controller

50 then commands the screw control 36 to advance the screw 22 at a rate that maintains a desired melt pressure of the molten thermoplastic material 24 in the nozzle 26. The screw control 36 may utilize a cavity pressure as an input to determine how for to advance the screw 22. This is known as a pressure controlled process. While the nozzle sensor 52 may directly measure the melt pressure, the nozzle sensor 52 may also indirectly measure the melt pressure by measuring other characteristics of the molten thermoplastic material 24, such as temperature, viscosity, flow rate, etc., which are indicative of melt pressure. Likewise, the nozzle sensor 52 need not be located directly in the nozzle 26, but rather the nozzle sensor 52 may be located at any location within the injection system 12 that is fluidly connected with the nozzle 26. If the nozzle sensor 52 is not located within the nozzle 26, appropriate correction factors may be applied to the measured characteristic to calculate an estimate of the melt pressure in the nozzle 26. The pressure sensor 52 need not be in direct contact with the injected fluid and may alternatively be in dynamic communication with the fluid and able to sense the pressure of the fluid and/or other fluid characteristics. In some embodiments, the nozzle sensor 22 may additionally or alternative include a velocity sensor that senses the velocity of the molten thermoplastic material 24 as it exits the nozzle 26.

Figure 2A:
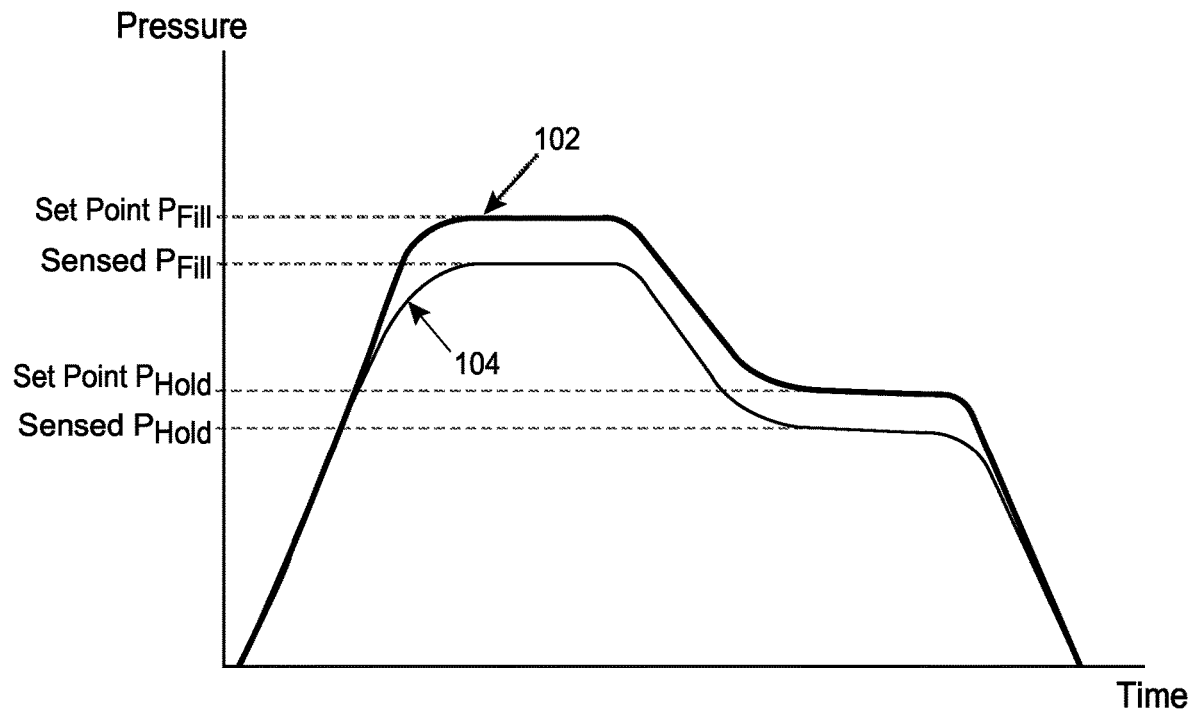
FIG. 2A illustrates a comparison plot of set point melt pressure and sensed melt pressure against time for a mold cycle executed by an injection molding machine constructed according to the disclosure.
Figure 2B:
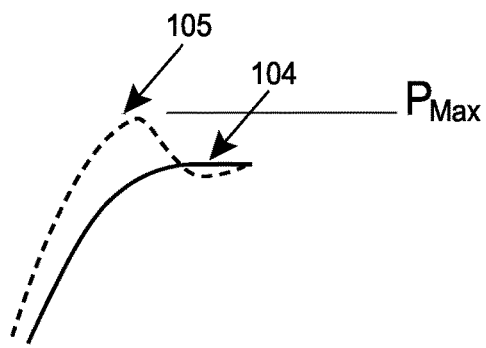
FIG. 2B illustrates particular aspects of the comparison plot of FIG. 2A.
Figure 3A:
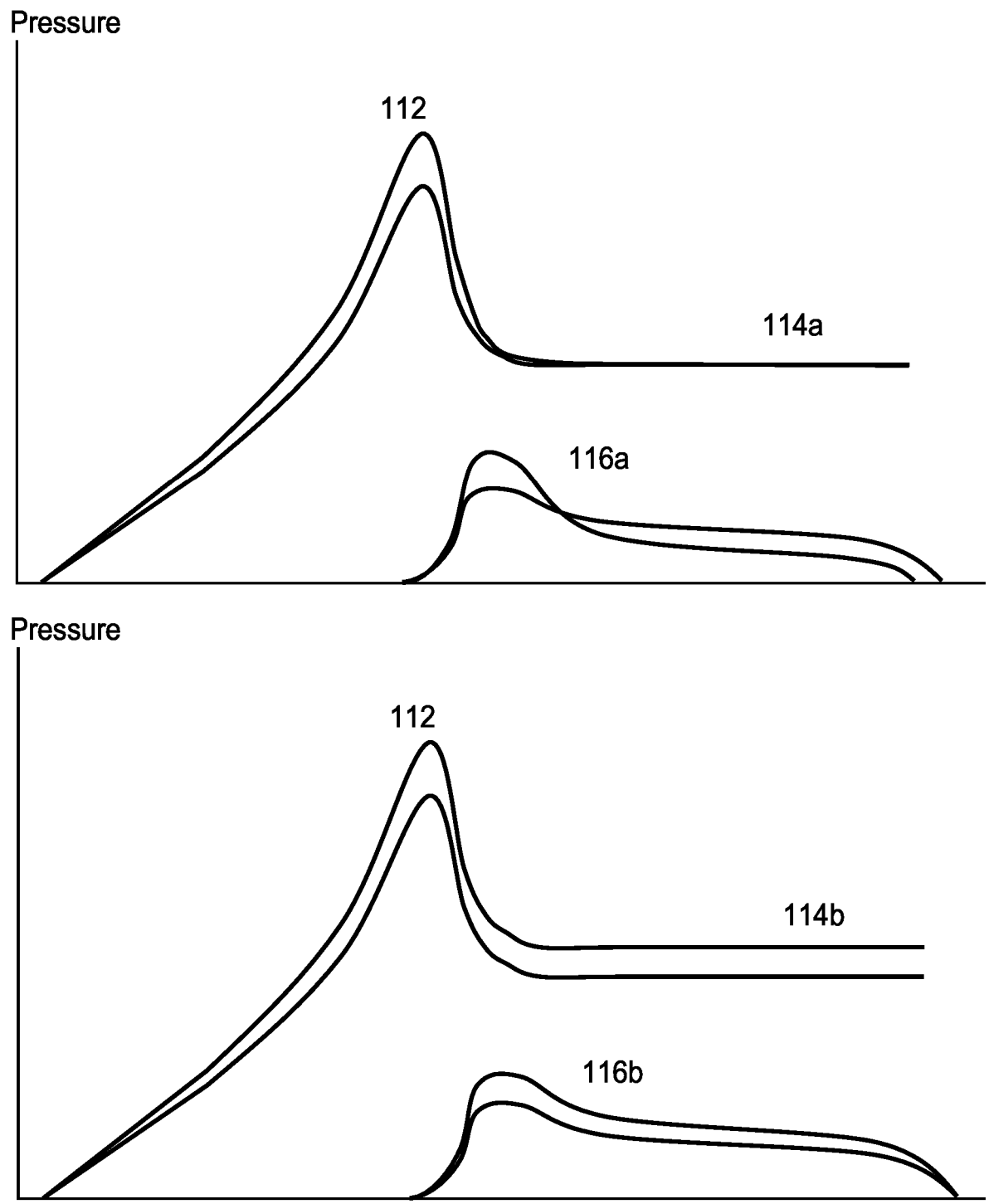
FIG. 3A is a comparison plot of melt pressure, hold pressure, and cavity pressure against time for conventional systems with and without the implementation of the disclosed techniques.

Turning now to FIGS. 2A-2B, a comparison plot of set point melt pressure values 102 and sensed melt pressure values 104 against time for a mold cycle executed by the injection molding machine 10 is illustrated. To this end, the sensed melt pressure values 104 may be generated by the nozzle sensor 52 and communicated to the controller 50 during the execution of the mold cycle. During an initial phase of the mold cycle, pressure rapidly increases to a set point value (set point $P_{Fill}$). In the fill phase, the pressure is held at the steady-state pressure value as the mold cavity 32 is filled. When molten plastic material 24 nears the end of the mold cavity 32, pressure is reduced to second, lower, set point value (set point $P_{Hold}$) In the pack and hold phase, the pressure is held at the steady-state pressure value as the material 24 in the mold cavity 32 cools. After the material 24 is cooled, the mold 28 is opened in the molded part is ejected from the mold cavity 32.

However, due to error introduced by the shift in viscosity, the actual, sensed pressure values 104 are different than the set point pressure values 102. To this end, rather than controlling the injection molding machine 10 to achieve the pack and hold phase set point value originally included in the mold cycle (set point $P_{Hold}$), the controller 50 predicts a cavity pressure value that scales the set point $P_{Hold}$ based on the calibration metrics and the sensed $P_{Fill}$ value. Accordingly, the controller 50 may compare the sensed pressure values 104 to one or more calibration metrics.

To develop the calibration metrics, the controller may execute a calibration cycle. In the scenario where the mold cycle of FIG. 2A is a calibration cycle, there are no calibration metrics on which to predict the cavity pressure. Accordingly, the injection molding system may use a pre-determined or user-input cavity pressure value to execute the calibration cycle. This value may be based on the MFI of the material and/or part weight of the resulting molded product. Thus, instead of predicting cavity pressure, the controller 50 may use the predetermined or user-input cavity pressure value as the input to the screw control 36 during calibration cycle.

After the calibration cycle is complete, the controller analyzes the sensed pressure values 104 to develop the calibration metrics. For example, to determine the calibration ratio, the controller compares the sensed $P_{Hold}$ value to the sensed $P_{Fill}$ value. It should be appreciated that due to the nature of step-response control, the pressure during the fill phase and the pack and hold phase are not constantly at the $P_{Fill}$ and $P_{Hold}$ value, respectively. Instead, the sensed pressure value may exhibit minor oscillations. Accordingly, $P_{Fill}$ and $P_{Hold}$ may be the average pressure sensed during the fill phase and pack and hold phase, respectively.

In another example, to determine the calibration error, the controller 50 determines a total amount of error between the sensed pressure values 104 and the set point pressure values 102. To this end, the total error is the sum of the difference between the set point values 102 and the sensed pressure values 104. In some embodiments, the total error is only measured until the steady-state $P_{Hold}$ value is reached. The total amount of error is divided by the duration of measured pressure values to determine an average error. This average error is referred to as the "calibration error."

In the scenario where the mold cycle of FIG. 2A is a mold cycle of a run, the sensed $P_{Fill}$ value is compared to the calibration ratio to determine the $P_{Hold}$ value needed to maintain the calibration ratio.

According to aspects, when the injection molding machine 10 exhibits the step response, the sensed pressure values do not immediately reach the steady-state value. Instead, as illustrated in FIG. 2B, the response overshoots the steady-state value and exhibits decreasing oscillatory error until achieving the steady-state value. Accordingly, while FIG. 2A illustrates the sensed pressure curve 104 without the overshoot, the sensed pressure curve 104 may actually exhibit the oscillatory error indicated by the pressure curve 105 as shown in FIG. 2B. This overshoot pressure associated with the step response of the fill phase of the mold cycle is referred to as the maximum pressure or "$P_{Max}$."

Thus, to account for the error caused by the change in viscosity, the controller 50 may compare the $P_{Max}$ of the sensed pressure curve 104 to the calibration error. Accordingly, the controller 50 is able to determine a cavity pressure value that causes the injection molding machine 10 to exhibit the desired pressure value during the pack and hold phase of the mold cycle.

Figure 4:
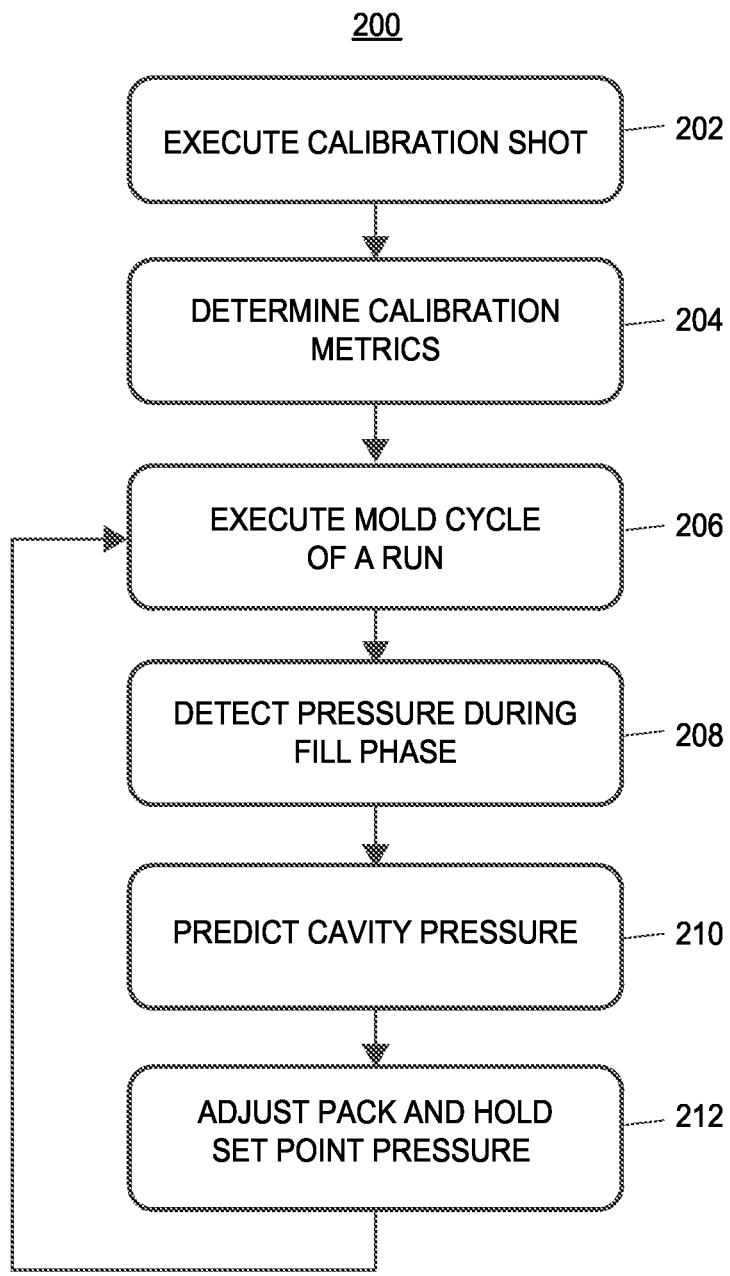
FIG. 4 illustrates an exemplary method for controlling an injection molding machine based on a predicted pressure.

FIG. 4 illustrates an exemplary method 200 for controlling an injection molding machine 10 based on a predicted cavity pressure for a pack and hold phase of a mold cycle. The method 200 may be performed by a controller 50 operatively connected to the injection molding machine 10.

The exemplary method 200 begins by the controller 50 executing a calibration cycle in accordance with a mold cycle at the injection molding machine 14 (block 202). In some embodiments, the calibration is a standalone execution of the mold cycle. In other embodiments, the calibration cycle is the first execution of the mold cycle included in a run. In these embodiments, the term "run," as it is otherwise generally used herein, excludes the calibration cycle. As there are no calibration metrics on which to virtually predict a cavity pressure, the calibration may utilize a pre-determined cavity pressure value or a user-input cavity pressure as an input to a screw control 32.

The controller 50 may analyze a plurality of sensed melt pressure values during the calibration cycle to determine one or more calibration metrics (block 204). For example, the controller 50 may determine a calibration ratio between pressure during the pack and hold phase of the mold cycle to the pressure during the fill phase of the mold cycle. In some embodiments, to determine the pressure during the fill phase, the controller 50 averages the sensed pressure values for the time period at which the injection molding machine exhibits the steady-state response associated with the fill phase (the first plateau of curve 104 of FIG. 2A). Similarly, in these embodiments, to determine the pressure during the pack and hold phase, the controller 50 averages the sensed pressure values for the time period at which the injection molding machine exhibits the steady-state response associated with the pack and hold phase (the second plateau of curve 104 of FIG. 2A).

As another example, the controller 50 may determine the average of error between the sensed melt pressured values during the calibration cycle and the set point pressure values. Accordingly, the controller 50 may determine a total amount of error (i.e., the difference between the pressure value sensed by the nozzle sensor 52 and the set point pressure value of the mold cycle) from the start of the mold cycle until the injection molding machine 10 exhibits the steady-steady response associated with the pack and hold phase of the mold cycle as sensed by a nozzle sensor 52. The controller 50 may then divide the total error by the time elapsed to determine the calibration error of the calibration cycle.

After generating the calibration metrics, the controller 50 executes a mold cycle of a run of mold cycles at the injection molding machine 10 (block 206). To quantify the impact of a shift in viscosity in the thermoplastic material 24, the controller 50 analyzes the response of the injection molding machine 10 prior to and during the fill phase of the mold cycle. Accordingly, the controller 50 detects a plurality of melt pressure values sensed by the nozzle sensor 52 prior to and during the fill phase of the mold cycle (block 208). To this end, the controller 50 receives the output of the nozzle sensor 52 via a wired or wireless communication link.

The controller 50 then compares the sensed pressure values to the calibration metrics to predict the cavity pressure the injection molding machine 10 will exhibit during the pack and hold phase of the mold cycle (block 210). In some embodiments, the controller 50 applies the calibration ratio to the melt pressure during the fill phase to generate a melt pressure set point for the pack and hold phase that maintains calibration ratio. The controller 50 may then modify the melt pressure set point to account for the error introduced by the shift in viscosity. To this end, the controller 50 may determine a percentage by which the melt pressure response overshot (the pressure value $P_{Max}$ of FIG. 2B) the $P_{Fill}$ set point of the mold cycle. The controller 50 may then scale the calibration error based on the determined percentage to determine a predicted amount of error for the pack and hold phase. Accordingly, the controller 50 may modify the melt pressure set point for the pack and hold phase to account for the predicted error. The controller 50 may then subtract the modified set point for the pack and hold phase from the set point for the mold cycle during the fill phase to predict the cavity pressure during the pack and hold phase.

The controller 50 may then adjust the set point pressure of the mold cycle for the pack and hold phase of the mold cycle based on the predicted cavity pressure (block 212). To this end, the controller 50 may transmit the predicted cavity pressure value to the screw control 36. In response, the screw control 36 causes the reciprocating screw to exert a cavity pressure the results in the injection molding machine achieving a steady-state melt pressure at the modified set point value. The controller 50 signals the cavity pressure to the screw control 36 using an application-layer interface, such as an application programming interface (API), that is communicated over a wired or wireless communication link.

The controller 50 may then continue executing additional mold cycles by performing the actions associated with blocks 206-212 until the run is complete. It should be appreciated that the viscosity of the thermoplastic material 24 may continue to shift throughout the run. Thus, the predicted melt pressures during the pack and hold phase, and the corresponding adjustments to the hold pressure, may vary between the mold cycles of the run.

In some embodiments, the predicted cavity pressure is used to adjust the $P_{Fill}$ and/or the $P_{Hold}$ set points in a subsequent mold cycle of the run. That is, the melt pressure set points of the subsequent mold cycle are changed in response to a detected shift in viscosity during the current mold cycle. In embodiments in which the nozzle sensor 52 includes a velocity sensor, the controller 50 may use the relative velocity of the thermoplastic material 24 during the pack and hold phase to the fill phase to scale the melt pressure set points.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An injection molding system comprising:
an injection molding machine including:
a pressure sensor configured to sense a melt pressure of a thermoplastic material; and
a controller operatively connected to the injection molding machine, the controller configured to:
execute a calibration cycle in accordance with a mold cycle using the injection molding machine;
analyze a plurality of melt pressure values sensed by the pressure sensor during the calibration cycle to determine one or more calibration metrics;
execute a mold cycle run using the injection molding machine; and
during each mold cycle of the run:
detect a plurality of melt pressure values sensed by the pressure sensors prior to and during a fill phase of the mold cycle;
compare the plurality of sensed melt pressures to the one or more calibration metrics to predict a cavity pressure during a pack and hold phase of the mold cycle; and
adjust a set point melt pressure for the pack and hold phase of the mold cycle based on the predicted cavity pressure to provide an optimal pack and hold phase pressure which accounts for changes due to viscosity and environmental variation to improve product quality.

2. The injection molding system of claim 1, wherein the injection molding machine does not include a sensor located in a cavity of the mold.

3. The injection molding system of claim 1, wherein to adjust the set point melt pressure for the pack and hold phase of the mold cycle, the controller is configured to:

analyze the predicted melt pressure for the pack and hold phase of the melt cycle to determine an offset from a set point melt pressure for the pack and hold phase of the melt cycle; and determine an adjustment to the hold pressure that compensates for the offset.

4. The injection molding system of claim 1, wherein one of the calibration metrics is a calibration ratio between melt pressure during the pack and hold phase of the mold cycle and melt pressure during the fill phase of the mold cycle.

5. The injection molding system of claim 4, wherein to predict the cavity pressure for the pack and hold phase of the mold cycle, the controller is configure to:

compare the melt pressure sensed by the pressure sensor during the fill phase of the mold cycle to the calibration ratio.

6. The injection molding system of claim 4, wherein:

the melt pressure during the fill phase of the mold cycle is an average melt pressure during the fill phase; and the melt pressure during the pack and hold phase of the mold cycle is an average melt pressure during the pack and hold phase of the mold cycle.

7. The injection molding system of claim 1, wherein one of the calibration metrics is a calibration error between the pressure values sensed by the pressure sensor and a plurality of set point pressure values for the mold cycle.

8. The injection molding system of claim 7, wherein to predict the cavity pressure for the pack and hold phase of the mold cycle, the controller is configured to:

determine a percentage a peak melt pressure sensed by the pressure sensor overshot a set point melt pressure for the fill phase of the mold cycle; and scale the calibration error based on the determined percentage.

9. The injection molding system of claim 1, wherein:

the injection molding machine includes a screw control that controls how far a screw advances; and to adjust the set point melt pressure for the pack and hold phase of the mold cycle, the controller transmits the predicted cavity pressure to the screw control.

10. The injection molding system of claim 1, wherein during the execution of a particular mold cycle of the run, the controller is configured to:

scale a set point melt pressure for a subsequent mold cycle of the run based on the predicted cavity pressure for the particular mold cycle.

11. The injection molding system of claim 1, wherein during the execution of a particular mold cycle of the run, the controller is configured to:

scale a set point melt pressure for a subsequent mold cycle of the run based on the ratio between a sensed velocity during the pack and hold phase of the mold cycle to a sensed velocity during a fill phase of the mold cycle.

* * * * *